United States Patent
Kim et al.

(10) Patent No.: US 9,580,531 B2
(45) Date of Patent: Feb. 28, 2017

(54) POLY(ETHYLENE-ALIPHATIC DIENE) COPOLYMER AND PREPARATION METHOD THEREOF

(71) Applicant: KOREA INSTITUTE OF INDUSTRIAL TECHNOLOGY, Cheonan-si (KR)

(72) Inventors: Dong-Hyun Kim, Gunpo-si (KR); Jung-Soo Kim, Wonju-si (KR); Dong-Jin Yang, Incheon (KR); Dong-Gyu Jeon, Incheon (KR)

(73) Assignee: KOREA INSTITUTE OF INDUSTRIAL TECHNOLOGY, Cheonansi (KR)

( * ) Notice: Subject to any disclaimer, the term of this patent is extended or adjusted under 35 U.S.C. 154(b) by 20 days.

(21) Appl. No.: 14/472,482

(22) Filed: Aug. 29, 2014

(65) Prior Publication Data

US 2015/0119532 A1 Apr. 30, 2015

(30) Foreign Application Priority Data

Oct. 31, 2013 (KR) .................. 10-2013-0130847

(51) Int. Cl.
*C08F 236/06* (2006.01)
*C08F 210/02* (2006.01)

(52) U.S. Cl.
CPC .......... *C08F 236/06* (2013.01); *C08F 210/02* (2013.01)

(58) Field of Classification Search
CPC ...... C08F 212/08; C08F 210/02; C08F 236/06
See application file for complete search history.

(56) References Cited

U.S. PATENT DOCUMENTS

| | | | | |
|---|---|---|---|---|
| 5,733,980 A | * | 3/1998 | Cozewith | C08F 297/08 525/314 |
| 7,847,021 B2 | | 12/2010 | Shinoda | |
| 2002/0086940 A1 | | 7/2002 | Ota | |
| 2003/0055179 A1 | * | 3/2003 | Ota | B32B 27/32 525/242 |
| 2013/0281641 A1 | * | 10/2013 | Kolb | C08F 4/76 526/126 |

FOREIGN PATENT DOCUMENTS

EP 0939777 7/2003

OTHER PUBLICATIONS

Pan et al. Macromolecules 2009, 42, 4391-4393.*
M. d. F. V. Marques, F. C. Rocha, and N. J. Soto, "Copolymerization of Ethylene/Diene with Different Metallocene Catalysts", znaturforsch, Apr. 2006.

* cited by examiner

*Primary Examiner* — Mark Kaucher
(74) *Attorney, Agent, or Firm* — Lex IP Meister, PLLC

(57) ABSTRACT

Disclosed is a poly(ethylene-aliphatic diene) copolymer having superior miscibility, adhesivity, printability and scratch resistance, compared to conventional TPO based TPEs or SBC TPEs, by introducing a variety of functional groups to an end portion of the ethylene-aliphatic diene copolymer such that the poly(ethylene-aliphatic diene) copolymer may be utilized in a variety of fields, and a method thereof.

6 Claims, No Drawings

POLY(ETHYLENE-ALIPHATIC DIENE) COPOLYMER AND PREPARATION METHOD THEREOF

BACKGROUND OF THE INVENTION

Field of the Invention

The present invention relates to a poly(ethylene-aliphatic diene) copolymer having improved properties such as adhesion, printability and the like by introducing a variety of functional groups, and a preparation method thereof.

Description of the Related Art

Thermoplastic elastomers (TPEs) consist of soft segments having elasticity and hard segments preventing deformation due to thermoplasticity. TPEs may be formed by a method identical to a method of processing thermoplastics. TPEs also have elasticity, which is a property of thermoplastic rubber, at room temperature. By varying amounts of soft segments and hard segments in TPEs, TPEs having various properties may be produced.

TPEs are utilized as a material in various fields such as shoes, adhesives, vehicles, industrial supplies, constructions, civil engineering, marine industries, wires, cables, electronic devices, electrical appliances, sports equipment, packing materials, medical supplies and the like. TPEs are also used in large quantities as a plastic conditioner or as compatibilizers for polymer alloys. The alloys using TPEs are utilized in electrical and electronic devices, cameras and the like. In addition, TPEs may provide properties such as conductivity, photosensitivity, selective separation and the like and, as such, may be utilized in fields requiring high functionality such as electrical engineering, optics, medicine, and printing. TPEs are attracting considerable attention due to such high functionality thereof. Particularly, in medical supplies, TPEs may be utilized as a high purity rubber material, without a vulcanization agent. People have great interest and are studying for such an advantage of TPEs.

Research and development for types of soft segments and hard segments, molecular weights, and arrangements of TPE products are being conducted. Thus, TPE products having high performance and functionality are being produced and TPE product types are being varied. In addition, demand for TPEs is increasing every year due to continuous use development and concern on the environment. As a result, TPE market is being expanded actively.

TPEs are classified into thermoplastic olefinic elastomers (TPO), thermoplastic styrenic block copolymers (SBC), thermoplastic polyurethanes (TPU), thermoplastic polyamides (TPAE), thermoplastic polyester elastomers (TPEE), and the like.

Most TPO based TPEs are block copolymers in which polypropylene, polystyrene, polyethylene, nylon, styrene-acrylonitrile and the like, which are hard, and ethylene propylene diene (EPDM) rubber, natural rubber, styrene-butadiene rubber (SBR) and the like, which are soft, are copolymerized. Among these, a random block copolymer consisting of ethylene/α-olefin is the most widely utilized. Most TPO based TPEs are a random copolymer. Recently, to improve properties of TPO based TPEs, methods using metallocene catalysts or introducing living polymerization has been proposed (Olefin-diene Copolymer, Korean Application Pub. Nos. 2012-0052385 and 2011-0114475).

As SBC based TPEs, Kraton Performance Polymers Inc. prepares and sells SBS (polystyrene/polybutylene binary copolymer), SEPS (polystyrene/poly(ethylene-propylene)/polystyrene terpolymer), SEBS (polystyrene/poly(ethylene-butylene))/polystyrene terpolymer) and the like under the registered trademark "Kraton". As similar products to the SBC based TPEs, a variety of polymers such as Solprene and Calprene series of Dynasol, SEPTON of KURARAY CO., LTD., and the like are commercially available.

Molecules of TPO based or SBC based TPEs are non-polar. Thus, the TPO based or SBC based TPEs do not adhere easily to metal, wood and plastic materials, and do not have miscibility with other polymers. For these reasons, use of the TPO based or SBC based TPEs is limited.

PRIOR ART LITERATURE

Patent Literature (PATENT LITERATURE 1) Korean Application Pub. No. 2012-0120430

SUMMARY OF THE INVENTION

Therefore, the present invention has been made in view of the above problems, and it is an object of the present invention to provide a copolymer modified with functional groups having high reactivity for the aliphatic dienes using aliphatic diene as monomers of TPO based TPEs, and having improved miscibility, adhesivity, printability and scratch resistance, as a result of studies into TPE modification for improvement in miscibility with and adhesivity to other polymers.

It is another object of the present invention to provide a poly(ethylene-aliphatic diene) copolymer having improved properties such that the copolymer may be utilized in a variety of fields, and a method preparing the same.

In accordance with the present invention, the above and other objects can be accomplished by the provision of a poly(ethylene-aliphatic diene) copolymer comprising an ethylene block and aliphatic diene block, wherein a portion of the aliphatic diene block is modified through substitution with a functional group selected from the group consisting of sulfides, hydroxyls, epoxies, amines, carboxylic acids, silane groups and combinations thereof.

Concretely, the aliphatic diene block modified with the functional group may be represented by Formula 1 below:

[Formula 1]

Wherein, $R_1$ is a linear or branched C1-C20 alkyl group, and $R_2$ is selected from OH, C(=O)OH, S($R_3$), $NR_4R_5$ and $SiR_6R_7R_8$, wherein $R_1$ and $R_2$ bind together to form an epoxy ring, $R_3$ is H or a C1-C30 alkyl group, $R_4$ and $R_5$ are the same or different, and are hydrogen, an C1-C10 alkyl group, a C3-C10 cycloalkyl group or an aryl group of C4-C15, and $R_6$ to $R_8$ are the same or different, and are hydrogen, an C1-C10 alkyl group, a C3-C10 cycloalkyl group or a C6-C15 aryl group, with the proviso that at least one of $R_6$ to $R_8$ is a C1-C10 alkoxy group or a functional group substituted with the alkoxy group of C1-C10 and all of $R_6$ to $R_8$ are not H.

In accordance with another aspect of the present invention, there is provided a method of preparing a poly(ethylene-aliphatic diene) copolymer comprising:

(a) polymerizing ethylene with a conjugated diene monomer to prepare an ethylene-aliphatic diene copolymer, and (b) modifying the ethylene-aliphatic diene copolymer.

DETAILED DESCRIPTION OF THE INVENTION

Hereinafter, the present invention will be described in detail.

The present invention proposes a copolymer having greatly improved properties by modifying a vinyl functional group of aliphatic diene in a copolymer consisting of an ethylene block and aliphatic diene block.

Preferably, the copolymer is a block copolymer wherein ethylene represented by a —[CH$_2$—CH$_2$]$_l$— block and an aliphatic diene monomer represented by —[CH$_2$—CH(—R$_1$—R$_2$)]$_m$— are copolymerized.

Here, the aliphatic diene block is substituted with a block represented by Formula 1 below and thereby, the copolymer is modified:

[Formula 1]

wherein, R$_1$ is a C1-C20 linear or branched alkyl group, R$_2$ is selected from OH, C(=O)OH, S(R$_3$), NR$_4$R$_5$ and SiR$_6$R$_7$R$_8$, wherein R$_1$ and R$_2$ bind together to form an epoxy ring, R$_3$ is hydrogen or a C1-C30 alkyl group, R$_4$ and R$_5$ are the same or different and are hydrogen, a C1-C10 alkyl group, a C3-C10 cycloalkyl group or a C4-C15 aryl group, and R$_6$ to R$_8$ are the same or different and are hydrogen, a C1-C10 alkyl group, a C3-C10 cycloalkyl group or a C6-C15 aryl group, with the proviso that at least one of R$_6$ to R$_8$ is a C1-C10 alkoxy group or a functional group substituted with the C1-C10 alkoxy group and all of R$_6$ to R$_8$ are not hydrogen.

R$_1$ of the aliphatic diene block is a C2-C20 linear or branched alkyl group. For example, R$_1$ may be substituted with an alkyl group such as ethyl, propyl, isopropyl, butyl, pentyl, hexyl, heptyl, octyl, nonyl and the like, and the C2-C20 linear or branched alkyl group may be substituted with at least one of alkyl groups such as a methyl, ethyl, propyl, isopropyl, butyl, pentyl, hexyl, heptyl, octyl and nonyl group.

The aliphatic diene monomer may be a C4-C20 conjugated diene based monomer such as 1,3-butadiene, isoprene, 2,3-dimethyl-1,3-butadiene, 1,2-dimethyl-1,3-butadiene, 1,4-dimethyl-1,3-butadiene, 1-ethyl-1,3-butadiene, 3-butyl-1,3-octadiene, 1,3-hexadiene, 4-methyl-1,3-pentadiene, 1,3-pentadiene, 3-methyl-1,3-pentadiene, 2,4-dimethyl-1,3-pentadiene, 3-ethyl-1,3-pentadiene and the like. As an embodiment of the present invention, 1,3-butadiene is utilized.

The aliphatic diene monomer has two double bonds. One double bond is polymerized with ethylene to form a main chain and the other double bond is used to introduce a variety of functional groups according to a modification method described below.

The functional groups which may be introduced may be S(R$_3$), OH, epoxy, 1, C(=O)OH or Si(OR$_4$)$_3$, wherein R$_3$ and R$_4$ are the same or different and may be a C1-C8 linear or branched alkyl group. By introducing the functional groups, properties of the copolymer may be improved. Particularly, since the functional group has high reactivity, adhesion of the polymer to other materials such as substrates by introducing a functional group is improved. In addition, a double bond in an aliphatic diene is polymerized with a functional group and, as such, mechanical properties of the polymer are improved.

By introducing the functional group, properties of thermoplastic elastomer (TPE) are improved within a certain substitution degree, preferably within the range of 5 to 50%, more preferably within the range of 10 to 30%. Here, when substitution degree is high, adhesion and printability are improved, however, mechanical properties may be reduced. Thus, substitution degree should be properly controlled within the above ranges.

Furthermore, the average molecular weight of a poly (ethylene-aliphatic diene) copolymer of Formula 1 may be controlled within the range of 10,000 to 1,000,000, the average molecular weight of a poly(styrene) block copolymer may be controlled within the range of 10,000 to 50,000. Here, the range of the molecular weight distribution degree of the poly(ethylene-aliphatic diene) copolymer is preferably 1.2 to 3.0. In addition, the average molecular weight of the poly(ethylene-aliphatic diene) copolymer is within the range of 20,000 to 3,000,000.

The poly(ethylene-aliphatic diene) copolymer of Formula 1 of the present invention is prepared in accordance with steps described below:

a) polymerizing ethylene with a conjugated diene monomer to prepare an ethylene-aliphatic diene copolymer, and b) modifying the ethylene-aliphatic diene copolymer to prepare a poly(ethylene-aliphatic diene) copolymer.

Hereinafter, each step will be described in more detail.

First, in step a), ethylene is polymerized with the conjugated diene monomer to prepare an ethylene-aliphatic diene copolymer.

The polymerization reaction may be carried out using any one of mass polymerization, solution polymerization, emulsion polymerization, suspension polymerization, slurry polymerization, vapor phase polymerization, and the like. Mechanism polymerization methods such as step polymerization, chain polymerization, ion polymerization, radical polymerization and living polymerization are applicable to the present invention. Preferably, living polymerization using metallocene catalysts is utilized in the present invention.

The metallocene catalysts have even active sites. Thus, by using metallocene catalysts, a narrow molecular weight distribution of the copolymer is obtained and it is easy to copolymerize ethylene with a conjugated diene monomer. In addition, the conjugated diene monomer is copolymerized evenly with ethylene and, as such, an even molecular weight distribution of the copolymerized conjugated diene is obtained.

Here, the metallocene catalysts are not limited to specific types. Any catalysts utilized in TPO polymerization are applicable. As an exemplary embodiment, central metals of the metallocene catalysts are group 4 transition metals. Ligands of the metallocene catalysts are cyclopentadienyl or derivatives thereof, fluorenyl or derivatives thereof, or indenyl or derivatives thereof. Structures of the metallocene catalysts are bridge or non-bridge structures. The central metals of the metallocene catalysts are, preferably, Ti or Zr. The ligands of the metallocene catalysts are, preferably, indenyl or derivatives thereof. The structures of the metallocene catalysts are, preferably, bridge structures. When the above preferable examples are used in the polymerization reaction, catalytic activity is superior.

An amount of the metallocene catalysts may be determined within a range sufficient to induce a sufficient polymerization reaction. The amount of the metallocene catalysts is not limited to specific levels in the present invention. For example, the metallocene catalysts may be utilized in an amount of 10-8 to 1 mol, preferably 10-7 to 10-1 mol, per unit volume (L) of a monomer, based on a concentration of the central metals (M) of the transition metal compounds.

The polymerization reaction may be batch, semi-continuous or continuous reaction. When living polymerization is empolyed, any of these types is possible.

In living polymerization, chain transfer reaction or termination reaction does not occur. Although polymerization reaction is terminated, polymerization activity is maintained in end portions (both end portions or one end portion) of the polymer. Thus, subsequent graft polymerization using an SBC based monomer may be carried out continuously.

Here, temperature and pressure of reactors, in which polymerization reaction is carried out, may be determined considering polymerization reaction efficiency, dependent on types of reactions and reactors. Thus, temperature and pressure of reactors are not limited to specific values. For example, the polymerization reaction may be carried out at a temperature of −50 to 500° C., preferably 0 to 150° C. and at a pressure of 1 to 3000 atm, preferably 1 to 500 atm.

Here, by using the metallocene catalysts described previously to prepare the poly(ethylene-aliphatic diene) copolymer, a microstructure of the copolymer may be easily changed. Thus, the poly(ethylene-aliphatic diene) copolymer having a large amount of conjugated diene monomer may be prepared. In addition, the poly(ethylene-aliphatic diene) copolymer having a large molecular weight and desired properties may be prepared.

Namely, the ratio of the ethylene polymerized with the poly(ethylene-aliphatic diene) copolymer to the conjugated diene monomer may be in the range of 1:0.1 to 1:10, preferably in the range of 1:0.1 to 1:5, more preferably in the range of 1:0.1 to 1:1. The average molecular weight (Mw) of the resultant poly(ethylene-aliphatic diene) copolymer may be in the range of 10,000 to 1,000,000, preferably in the range of 50,000 to 800,000.

Solvents, initiators, polymerization regulators utilized in the polymerization reaction of the present invention are not specifically limited.

The solvents may be hydrocarbons which do not react with living anionic chain ends of a copolymer, are easily utilized in commercial polymerization apparatus, and provide proper solubility to polymers. For example, non-polar aliphatic hydrocarbons, in which ionization hydrogen is generally deficient, are suitable. As generally utilized solvents, there are cyclic alkanes, for example, cyclopentane, cyclohexane, cycloheptane and cyclooctane. All of the above cyclic alkanes are relatively non-polar. Other solvents may be selected from solvents which are already known to a person skilled in the art and effectively react under predetermined conditions, particularly, temperature.

The polymerization initiators comprise, for example, alkyl lithium compounds such as s-butyl lithium, n-butyl lithium, t-butyl lithium and amyl lithium, and other organolithium compounds such as analogous compounds thereof. In addition, the polymerization initiators comprise di-initiators such as a di-sec-butyl lithium adduct of m-diisopropyl benzene. Here, an amount of the polymerization initiator may be calculated based on one initiator molecular per a desired polymer chain, in a polymerization mixture (comprising monomers and solvents).

The polymerization regulators may control a microstructure of the poly(ethylene-aliphatic diene) copolymer by regulating contents of the ethylene block and conjugated diene block. In addition, the polymerization regulators may control the grafting degree of a graft-polymerized poly(styrene) block copolymer after controlling an amount of the conjugated diene.

Next, by modification reaction of the ethylene-aliphatic diene, the poly(ethylene-aliphatic diene) copolymer of Formula 1 is prepared. The modification reaction is varied according to introduced functional groups. Hereinafter, a modification reaction for each functional group will be described. Here, as aliphatic diene, 1,4-butadiene is utilized for convenience.

(1) OH Modification Method

To introduce a hydroxyl group to the polybutadiene block, the poly(ethylene-butadiene) is reacted with a borane compound and then is treated with an oxidizing agent, as described in Reaction Formula 1 below:

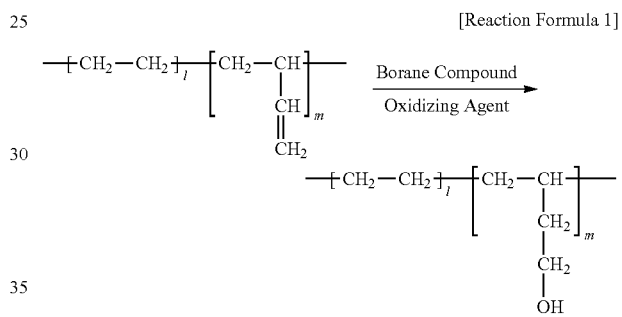

[Reaction Formula 1]

In the above reaction, hydroboration reaction occurs. Namely, the poly(ethylene-butadiene) is converted into alkyl borane using a borane compound, $HBR_4$. Here, the alkyl borane is changed to a hydroxyl group using an oxidizing agent. Namely, oxidation reaction occurs.

Such reactions are carried out according to methods described in literature below: [J. M. Clay, E. Vedejs, Hydroboration with Pyridine Borane at Room Temperature, J. Am. Chem. Soc., 2005, 127, 5766-5767], [G. W. Kabalka, T. M. Shoup, N. M. Goudgaon, Sodium perborate: Mild and Convenient Reagent for Efficiently Oxidizing Organoboranes, J. Org. Chem., 1989, 5930-5933], [P. K. Patra, K. Nishide, K. Fuji, M. Node, Dod-S-Me and Methyl 6-Morpholinohexyl Sulfide (MMS) as New Odorless Borane Carriers, Synthesis, 2004, 1003-1006], and [P. V. Ramachandran, M. P. Jennings, An Exceptional Hydroboration of Substituted Fluoroolefins Providing Tertiary Alcohols, Org. Lett., 2001, 3, 3789-3790].

Available borane compounds comprise $BH_3$, $B_2H_6$, 9-BBN(9-Borabicyclo(3.3.1)nonane), catecholborane, thexylborane ($ThxBH_2$), thexylchloroborane (ThxBHCl), disiamylborane ($Sia_2BH$), dicyclohexylborane ($Chx_2BH$) and the like.

As the oxidizing agent, $H_2O_2$, NaOH, H2O and the like may be utilized.

Preferably, in Reaction Formula 1, $BH_3/H_2O_2$ or 9-BBN/NaOH may be utilized. Here, reaction conditions, which are not specifically limited, may be conditions described in the above literature.

(2) C(=O)OH Modification Method

To introduce a carboxylic acid group to the polybutadiene block, the poly(ethylene-butadiene) is treated with carbon dioxide as described in Reaction Formula 2 below:

[Reaction Formula 2]

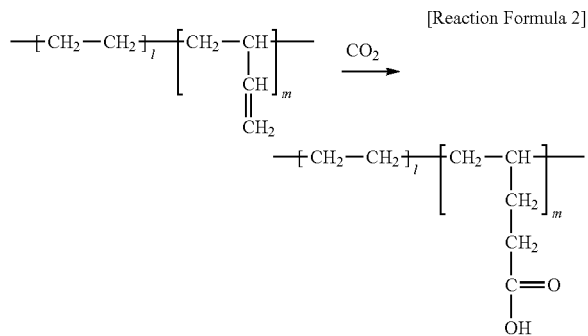

If considered necessary for the above reaction, a catalyst may be utilized. For example, Williams et al. substituted styrenes with carboxylic acid using $CO_2$ in the presence of a nickel catalyst/diethylzinc reductant [C. M. Williams, J. B. Johnson, T. Rovis, A nickel-catalyzed reductive carboxylation of styrenes using CO2 proceeds under mild conditions using diethylzinc as the reductant. The catalyst system is very robust and will fixate CO2 in good yield even if exposed to only an equimolar amount introduced into the headspace above the reaction. J. Am. Chem. Soc., 2008, 130, 14936-14937]. M. D. Greenhalgh et al. reacted aryl alkenes with $CO_2$ and EtMgBr as a hydride in the presence of a $FeCl_2$ catalyst, bis(imino)pyridine, to generate α-aryl carboxylic acids [M. D. Greenhalgh, S. P. Thomas, Hydrocarboxylation of aryl alkenes in the presence of $FeCl_2$ as precatalyst, bis(imino)pyridine as ligand, an atmospheric pressure of $CO_2$, and EtMgBr as a hydride source gives α-aryl carboxylic acids in excellent yields and with near-perfect regioselectivity. Various, electronically differentiated aryl alkenes were transformed to the corresponding α-aryl carbo xylic acids in very good isolated yield. J. Am. Chem. Soc., 2012, 134, 11900-11903]. Reaction conditions of Reaction Formula 2 may be determined by referring to the above literature.

(3) S(R$_3$) Modification Method

To introduce a sulfide group to the polybutadiene block, the poly(ethylene-butadiene) is reacted with a thiol compound as described in Reaction Formula 3 below:

[Reaction Formula 3]

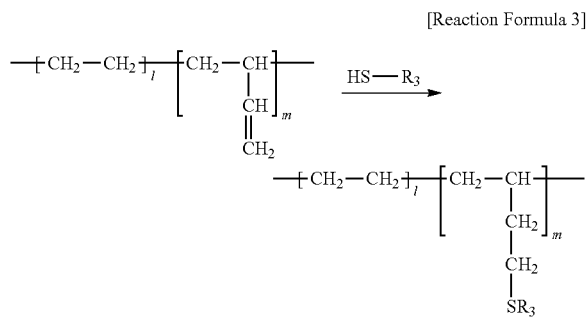

In the above formula, $R_3$ is hydrogen and a C1-C30 alkyl group.

The above reaction may be carried out using methods described in literature as follows: a thiol-ene reaction method using $CeCl_3$ [C. C. Silveira, S. R. Mendes, F. M. Libero, The anti-Markovnikov addition of thiols to alkenes using $CeCl_3$ as catalyst leads to products in very good yields. The reaction occurred under solvent-free conditions at room temperature, Synlett, 2010, 790-792], a method of adding water [B. C. Ranu, T. Mandal, A highly selective anti-Markovnikov addition of thiols to unactivated alkenes in water at room temperature without any additive is a very simple and efficient method for the synthesis of linear thioethers. Synlett, 2007, 925-928], and the like.

Here, the thiol compound ($HSR_3$) is not specifically limited, however, an aliphatic thiol compound is preferably utilized. As a representative example, C1-C30 alkane thiols are possible. The C1-C30 alkane thiols comprise, for example, 1-pentanethiol, 1-hexanethiol, 1-heptanethiol, 1-octanethiol, 1-decanethiol, 1-dodecane-thiol and the like.

Here, conditions of the reaction, which are not specifically limited, may be thiol-ene reaction conditions publicly known or methods described in the above literature.

(4) Epoxy Cyclization Method

Epoxy cyclization means that some alkyl groups of aliphatic diene bind together to form epoxy rings. The epoxy cyclization may be carried out by a variety of epoxidations such as Jacobsen-Katsuki Epoxidation, Prilezhaev Reaction, Sharpless Epoxidation, Shi Epoxidation and the like.

Concretely, the epoxy cyclization may be carried out by treating the poly(ethylene-butadiene) with an oxidizing agent as illustrated in Reaction Formula 4 below and if considered necessary, a catalyst may be utilized.

[Reaction Formula 4]

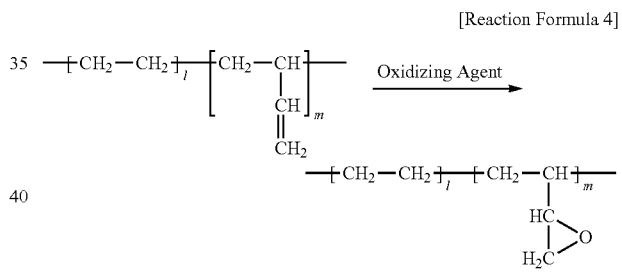

For an example, in Jacobsen-Katsuki Epoxidation, a Mn-salen catalyst and an oxidizing agent may be utilized. The epoxidation may be carried out referring to literature as follows: E. N. J acobsen, W. Zhang, A. R. Muci, J. R. Ecker, L. Deng, Highly Enantioselective Epoxidation Catalysts Derived from 1,2-diaminocyclohexane, J. Am. Chem. Soc., 1991, 113, 7063-7064, and [B. D. Brandes, E. N. Jacobsen, Highly Enantioselective Epoxidation Catalysts Derived from 1,2-diaminocyclo hexane, J. Org. Chem., 1994, 59, 4378-4380].

The Prilezhaev Reaction utilizes 3-chloroperoxybenzoic acid (MCPBA). The reaction may be carried out referring to literature as follows: [N. K. Jan a, J. G. Verkade, Use of a solvent with greater density than the fluorous phase is an alternative to the U-tube method in phase-vanishing reactions in cases where both reactants are less dense than the fluorous phase, Org. Lett., 2003, 5, 3787-3790] and [Y.-B. Kang, L. H. Gade, A clean and efficient and metal-free diacetoxylation reaction of alkenes using commercially available peroxyacids as oxidants is catalyzed by triflic acid. This method enables also oxidative lactonizations of unsaturated carboxylic acids in good to high yields. J. Org. Chem., 2012, 77, 1610-161 5].

The Sharpless Epoxidation utilizes t-butyl hydroperoxide as an oxidizing agent and Ti(OiPr)$_4$ as a catalyst. The epoxidation may be carried out referring to literature as follows: [Johnson, R. A. and Sharpless, K. B. Comp. Org. Syn. 1991, 7, 389~436], [Huft, E. Top. Curr. Chem. 1993, 164, 63~77], [Katsuki, T. and Martin, V. S. Org. React. 1996, 48, 1~300], and [Pfenninger, A. Synthesis, 1986, 89~116].

The Shi epoxidation means that a compound reacts with KHSO$_5$ after reacting with an oxidizing agent, 2 KHSO$_5$.KHSO$_4$.K$_2$SO$_4$. The epoxidation may be carried out referring to literature as follows: [Z.-X. Wang, Y. Tu, M. Frohn, J.-R. Zhang, Y. Shi, An Efficient Catalytic Asymmetric Epoxidation Method, J. Am. Chem. Soc., 1997, 119, 11224-11235], [H. Tian, X. She, L. Shu, H. Yu, Y. Shi, Highly Enantioselective Epoxidation of cis-Olefins by Chiral Dioxirane, J. Am. Chem. Soc., 2000, 122, 11551-11552], [N. Nieto, I. J. Munslow, H. Fernandez-Perez, A. Vidal-Ferran, Exploring Substrate Scope of Shi-Type Epoxidations, Synlett, 2008, 28 56-2858], and [B. Wang, O. A. Wong, M.-X. Zhao, Y. Shi, Asymmetric Epoxidation of 1,1-Disubstituted Terminal Olefins by Chiral Dioxirane via a Planar-like Transition State, J. Org. Chem., 2008, 73, 9539-9543].

(5) Amine Modification Method

To introduce an amine group to the polybutadiene block, the poly(ethylene-butadiene) is reacted with an amine compound by hydroamination reaction, as described in Reaction Formula 5 below:

[Reaction Formula 5]

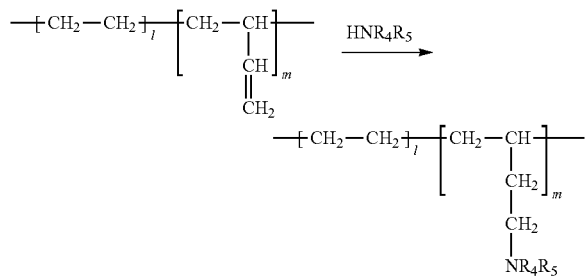

In the above formula, R$_4$ and R$_5$ are the same or different, and hydrogen, a C1-C10 alkyl group or a C3-C10 cycloalkyl group, and a C6-C15 aryl group).

The amine compounds (H—NR$_4$R$_5$), which are not specifically limited, may be, for example, ammonia, methylamine, ethylamine, dimethylamine, methylethylamine and the like.

The above reaction, if considered as necessary, may utilize a catalyst. Here, the catalyst may be a transition metal catalyst.

Such a reaction may be carried out referring to literature as follows: [Jain, A. Hydroamination-Direct Addition of Amines to Alkenes and Alkynes, Kai C. Hultzsch. "Catalytic Asymmetric Hydroamination of Non-activated Olefins", Organic & Biomolecular Chemistry, 2005 3 (10): 1819~1824], [Hartwig, J. F., Development of Catalysts for the Hydroamination of Olefins, Pure Appl. Chem. 2004, 76 (3): 507~516], [Shi, Y. H et al, Titanium Dipyrrolylmethane Derivatives: Rapid Intermolecular Alkyne Hydroamination", Chemical Communications 2003, 5 (5): 586~587], [Pohlki, F., Doye, S. (2003), "The Catalytic Hydroamination of Alkynes". Chemical Society Reviews, 32 (2): 104~114] and [Ryu J S et al., Organolathanide-catalyzed Regioselective Intermolecular Hydroamination of Alkenes, Alkynes, Vinylarenes, Di- and Trivinylarenes, and Methylenecyclopropanes, Scope and Mechanistic Comparison to Intramolecular Cyclohydroaminations. J Am Chem. Soc. 2003 Oct. 15; 125(41):12584-605].

(6) SiR$_6$R$_7$R$_8$ Modification Method

To introduce a silane group to the polybutadiene block, the poly(ethylene-butadiene) is reacted with a silane compound as illustrated in Reaction Formula 6 below:

[Reaction Formula 6]

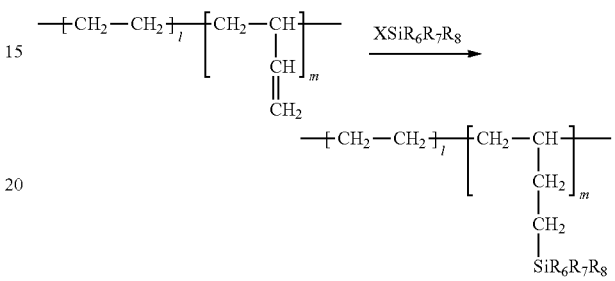

In the above formula, R$_6$ to R$_8$ are the same or different and may be hydrogen, OH, a C1-C10 alkyl group, a C3-C10 cycloalkyl group, a C1-C10 alkoxy group or a C6-C15, with the proviso that all of R$_6$ to R$_8$ are not hydrogen, and X is a leaving group and H or a halogen group.

A silane compound (HSiR$_6$, R$_7$R$_8$) utilized in the above reaction is an alkoxysilane compound. The silane compound (HSiR$_6$, R$_7$R$_8$), which is not specifically limited, may be, preferably, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, methyltrimethoxysilane, methyltriethoxysilane, methyltripropoxysilane, propylethyltrimethoxysilane, ethyltriethoxysilane and the like.

To introduce ethoxysilane to the poly(ethylene-butadiene), SiH(CH$_3$)(OEt)$_2$ as a silane compound and PtO$_2$ as a catalyst may be utilized according to a method proposed by N. Sabourault et al (N. Sabourault, G. Mignani, A. Wagner, C. Mioskowski, Platinum oxide is a versatile and powerful hydrosilylation catalyst for alkenes. Tolerance of various functional groups (amines, epoxides, nitriles, carbon acids and esters), highly reproducible results and easy removal make this catalyst a useful tool for hydrosilylation. Org. Lett., 2002, 4, 2117-2119). Reaction conditions of Reaction Formula 6 may be determined referring to the above literature.

Some aliphatic diene repeat units of the poly(ethylene-aliphatic diene) copolymer modified by the above reaction are substituted with a sulfide, hydroxy, epoxy, amine, carboxyl or silane group. Since the groups have high reactivity, the groups provide superior miscibility, adhesivity, printability and scratch resistance to other materials (for example, substrate). In addition, the functional groups bind with a portion of double bonds of the aliphatic diene and, as such, mechanical properties are improved.

As a result, the poly(ethylene-aliphatic diene) copolymer of the present invention may be utilized instead of the prior thermoplastic elastomers (TPEs). Particularly, the poly(ethylene-aliphatic diene) copolymer of the present invention may be utilized in fields requiring superior adhesivity and printability such as, for example, shoes, adhesives, vehicles, industrial supplies, constructions, civil engineering, marine industries, wires, cables, electronic devices, electrical appliances, sports equipment, packing materials, medical supplies, printers, compatibilizers and the like.

In the following examples, the present invention will be described in more detail. It should be understand that the examples are merely to concretely explain the spirit of the invention and therefore, there is no intent to limit the invention to the examples.

Preparation Example 1

Poly(ethylene-butadiene) Copolymer Synthesis 400 mL of toluene, 13.58 g (0.25 mol) of 1,3-butadiene and ethylene were added to two 500 mL reactors at 0.4 MPa for 30 minutes.

To prepare a catalyst solution, 2.5 mol of 1,2,4-trimethylcyclopentadienyl 2,6-isopropylaryloxo titanium dichloride as a catalyst and methylaluminoxane as a cocatalyst, in a 1:3000 molar ratio between the 1,2,4-trimethylcyclopentadienyl 2,6-isopropylaryloxo titanium dichloride and the methylaluminoxane, were dissolved in toluene.

Temperatures of the reactors were maintained at 50° C. After adding the catalyst solution to the reactors, polymerization was carried out for 30 minutes. Thereafter, methanol and hydrochloric acid were added to the reactors to terminate polymerization. Next, reaction products were isolated and then dried at reduced pressure at 60° C. for 6 hours, to obtain the poly(ethylene-butadiene) copolymer. The prepared poly(ethylene-butadiene) copolymer was directly utilized in a next stage without additional purification.

Example 1

Preparation of poly(ethylene-butadiene) Copolymer Modified with OH

Using the poly(ethylene-butadiene) copolymer in Preparation Example 1, a poly(ethylene-butadiene) copolymer modified with OH was prepared.

The poly(ethylene-butadiene) copolymer of Preparation Example 1 was dissolved in toluene. Thereafter, 9-BBN (1.0 eq) was added to the reactor and then a reaction was carried out for 1 hour. Thereafter, after adding a large amount of $NaOH/H_2O_2$ to the reactor, reaction was carried for 3 hours. Finally, methanol and hydrochloric acid were added to the reactor to terminate the polymerization reaction.

Example 2

Preparation of poly(ethylene-butadiene) Copolymer Modified with Carboxylic Acid

Using the poly(ethylene-butadiene) copolymer prepared in Preparation Example 1, a poly(ethylene-butadiene) copolymer modified with carboxylic acid was prepared.

The poly(ethylene-butadiene) copolymer Of Preparation Example 1 was dissolved in toluene. Thereafter, a $Ni_{(acac)_2}$ catalyst (0.1 eq) was added to the reactor. Thereafter, reductants, $Et_2Zn$ (2.5 eq) and $Cs_2CO_3$ (0.2 eq), which were dissolved in THF, were added to the reactor. Thereafter, $CO_2$ was added to the reactor. Polymerization was carried out at 23° C. for 10 hours. Finally, methanol and hydrochloric acid were added to terminate the polymerization reaction.

Example 3

Preparation of poly(ethylene-butadiene) Copolymer Modified with Sulfide ($—SCH_3$)

Using the poly(ethylene-butadiene) copolymer prepared in Preparation Example 1, a poly(ethylene-butadiene) copolymer modified with sulfide was prepared.

The poly(ethylene-butadiene) copolymer of Preparation Example 1 was dissolved in toluene. Thereafter, $CH_3—SH$ (1.1 eq) and water were added to the reactor and then reactor was maintained at 23° C. for 3 hours such that polymerization proceeded. Finally, methanol and hydrochloric acid were added to the reactor to terminate the polymerization reaction.

Example 4

Preparation of poly(ethylene-butadiene) Copolymer Modified with Epoxy Ring

Using the poly(ethylene-butadiene) copolymer prepared in Preparation Example 1, a poly(ethylene-butadiene) copolymer modified with epoxy was prepared.

The poly(ethylene-butadiene) copolymer of Preparation Example 1 was dissolved in toluene. Thereafter, 9-BBN (1.0 eq) was added to the reactor and then the solution was reacted for 1 hour. Thereafter, a large amount of $NaOH/H_2O_2$ was added to the reactor. Finally, methanol and hydrochloric acid were added to the solution to terminate the polymerization reaction.

Example 5

Preparation of poly(ethylene-butadiene) Copolymer Modified with Amine

Using the poly(ethylene-butadiene) copolymer prepared in Preparation Example 1, a poly(ethylene-butadiene) copolymer modified with amine was prepared.

The poly(ethylene-butadiene) copolymer of Preparation Example 1 was dissolved in toluene. Thereafter, a $Ni_{(acac)_2}$ catalyst (0.1 eq), and reductants, $Et_2Zn$ (2.5 eq) and $Cs_2CO_3$ (0.2 eq), which were dissolved in THF, were added to the reactor. Thereafter, $CO_2$ was added to the reactor and then the reactor was maintained at 23° C. for 10 hours such than polymerization proceeded. Finally, methanol and hydrochloric acid were added to terminate the polymerization reaction.

Example 6

Preparation of poly(ethylene-butadiene) Copolymer Modified with Methyldiethoxy Silane Using the poly(ethylene-butadiene) copolymer prepared in Preparation Example 1, a poly(ethylene-butadiene) copolymer with silane was prepared.

The poly(ethylene-butadiene) copolymer of Preparation Example 1 was dissolved in toluene. Thereafter, to the reactor, Si(H)(CH₃)(OEt)₂ was added and then a 0.01 mol % PtO₂ catalyst was added. The reactor was maintained at 85° C. for hours such that polymerization proceeded. Finally, methanol and hydrochloric acid were added to the reactor to terminate the polymerization reaction.

Comparative Example 1

Poly(ethylene-butadiene-styrene) Terpolymer

To prepare a catalyst solution, 2.5 mol 1,2,4-trimethylcyclopentadienyl 2,6-isopropylaryloxo titanium dichloride as a catalyst, and methylaluminoxane as a cocatalyst in a 1:3000 molar ration between the 1,2,4-trimethylcyclopentadienyl 2,6-isopropylaryloxo titanium dichloride and the methylaluminoxane were dissolved in toluene.

Reactor temperatures was maintained at 50° C. After adding the above catalyst solution to the reactor, polymerization reaction was carried out for 30 minutes. Thereafter, methanol and hydrochloric acid were added to the reactor such that the polymerization reaction was terminated. Next, reaction product was isolated and then dried at reduced pressure at 60° C. for 6 hours, to obtain the poly(ethylene-butadiene) copolymer.

Experimental Example 1

Spectroscopic Analysis of Copolymers

Properties of the copolymers prepared in Examples 1 to 3 were analyzed using GPC and DSC instruments. The results are summarized in Table 1.

(1) Gel permeation chromatography (GPC): Average molecular weights (Mw) and molecular weight distributions (Mw/Mn) of the poly(ethylene-butadiene) copolymers were measured using a PL-GPC 210 system (Polymer Laboratories Ltd.). The measurements were carried out at 140° C.

(2) Differential scanning calorimetery (DSC): A glass transition temperature (Tg) was measured using a PL-GPC 210 system (Polymer Laboratories Ltd.).

(3) Substitution degree: The substitution degree for each functional group was measured using a publicly method known.

Referring to above Table 1, the copolymers prepared in the present invention have very narrow molecular weight distributions and glass transition temperatures of −30° C. to −50° C.

Experimental Example 2

Property Analyses

To compare properties of the copolymers in the above examples and comparative examples, adhesivities and heat resistances of the copolymers were measured. Here, as a control 1, a poly(ethylene-butadiene) binary copolymer was utilized. Results are summarized in Table 2 below.

For experiments, compounds prepared in examples and comparative examples were dissolved in dimethylchloride. Thereafter, approximately 3 g/m² of a dried film was tamping on a polyethylene terephthalate (PET) film and paper using an auto proofer equipped with a gravure copper plate. Thereafter, a thick film was formed by evaporative drying.

(1) To estimate adhesivities, cellophane tapes were attached on a surface of the thick films having the compounds of the examples and comparative examples and then the attached cellophane tapes were detached instantaneously from the surfaces of the thick films. The conditions of thick film surfaces were observed with the naked eye. When the thick film was not detached, a score was 5. Whereas, when most of the thick film was detached, a score was 1.

(2) To estimate printabilities, the thick films were observed with the naked eye. When the printed condition was excellent, a score of 5 was given. Whereas, when the printed condition was the poorest, a score of 1 was given.

(3) To estimate scratch resistances, surfaces of a thick films were rubbed 20 times using an abrasion tester. The thick film surfaces were observed with the naked eye. When the thick film surface was not scratched, a score of 5 was given. Whereas, when entire surface of the thick film was scratched, a score of 1 was given.

TABLE 1

| | Modified functional groups | Average molecular weight (Mw) | Molecular weight distributions (Mw/Mn) | Tg | Substitution degree |
|---|---|---|---|---|---|
| Example 1 | —OH | 310,000 g/mol | 2.4 | −45° C. | 44% |
| Example 2 | —CO₂H | 315,000 g/mol | 2.5 | −42° C. | 41% |
| Example 3 | —SCH₃ | 285,000 g/mol | 2.4 | −42° C. | 35% |
| Example 4 | Epoxy | 290,000 g/mol | 2.6 | −39° C. | 40% |
| Example 5 | —NH₂ | 295,000 g/mol | 2.7 | −40° C. | 49% |
| Example 6 | —Si (CH₃) (OCH₂CH₅)₂ | 305,000 g/mol | 2.5 | −41° C. | 35% |

TABLE 2

|  | Adhesivities | Printabilities | Scratch resistances |
|---|---|---|---|
| Example 1 | 5 | 5 | 5 |
| Example 2 | 5 | 5 | 5 |
| Example 3 | 5 | 5 | 5 |
| Example 4 | 5 | 5 | 5 |
| Example 5 | 5 | 5 | 5 |
| Example 6 | 5 | 5 | 5 |
| Comparative Example 1 | 2 | 2 | 3 |

The above films comprising the poly(ethylene-aliphatic diene) copolymer in accordance with the present invention showed superior properties such as printability, adhesivity, scratch resistances, and the like.

As is apparent from the above description, the present invention provides a poly(ethylene-aliphatic diene) copolymer, a vinyl functional group in aliphatic diene of which is modified with a variety of functional groups, to improve functionality, miscibility, adhesivity, printability and scratch resistance of the copolymer such that the copolymer may be utilized in a variety of fields.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A poly(ethylene-aliphatic diene) copolymer consisting of ethylene blocks and aliphatic diene blocks, wherein a portion of the aliphatic diene block is modified by substituting with a functional group selected from the group consisting of a sulfide group, a hydroxyl group, an epoxy group, an amine group, a carboxylic acid group, a silane group and combinations thereof, the aliphatic diene block modified by substituting with the functional group is represented by Formula 1 below:

[Formula 1]

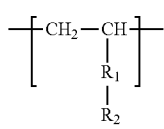

wherein $R_1$ is a linear or branched C1-C20 alkyl group, and $R_2$ is selected from OH, C(=O)OH, S($R_3$), $NR_4R_5$ and $SiR_6R_7R_8$, wherein $R_1$ and $R_2$ bind together to form an epoxy ring, $R_3$ is hydrogen or a C1-C30 alkyl group, $R_4$ and $R_5$ are identical or different, and are hydrogen, a C1-C10 alkyl group, a C3-C10 cycloalkyl group or an aryl group of C4-C15, and $R_6$ to $R_8$ are identical or different, and are hydrogen, a C1-C10 alkyl group, a C3-C10 cycloalkyl group or a C6-C15 aryl group, with the proviso that at least one of $R_6$ to $R_8$ is a C1-C10 alkoxy group or a functional group substituted with the C1-C10 alkoxy group and all of $R_6$ to $R_8$ are not H.

2. The poly(ethylene-aliphatic diene) copolymer according to claim 1, wherein the aliphatic diene block is polymerized with one monomer selected from the group consisting of 1,3-butadiene, isoprene, 2,3-dimethyl-1,3-butadiene, 1,2-dimethyl-1,3-butadiene, 1,4-dimethyl-1,3-butadiene, 1-ethyl-1,3-butadiene, 3-butyl-1,3-octadiene, 1,3-hexadiene, 4-methyl-1,3-pentadiene, 1,3-pentadiene, 3-methyl-1,3-pentadiene, 2,4-dimethyl-1,3-pentadiene, 3-ethyl-1,3-pentadiene, and combinations thereof.

3. The poly(ethylene-aliphatic diene) copolymer according to claim 1, wherein an average molecular weight (Mw) of the poly(ethylene-aliphatic diene) copolymer is 20,000 to 3,000,000 and molecular weight distribution of the poly(ethylene-aliphatic diene) copolymer is 1.2 to 3.0.

4. A method of preparing the poly(ethylene-aliphatic diene) copolymer according to claim 1 comprising:

(a) polymerizing ethylene with a conjugated diene monomer to prepare an ethylene-aliphatic diene copolymer, and (b) modifying the ethylene-aliphatic diene copolymer.

5. The method of preparing the poly(ethylene-aliphatic diene) copolymer according to claim 4, wherein the step (a) is carried out by living polymerization in the presence of a metallocene catalyst.

6. The method of preparing the poly(ethylene-aliphatic diene) copolymer according to claim 5, wherein a central metal of the metallocene catalyst is a group 4 transition metal, a ligand of the metallocene catalyst is cyclopentadienyl or derivatives thereof; fluorenyl or derivatives thereof; indenyl or derivatives thereof, and a structure of the metallocene catalyst is bridged or non-bridged structure.

* * * * *